United States Patent
O'Neil et al.

(10) Patent No.: US 10,766,631 B2
(45) Date of Patent: Sep. 8, 2020

(54) MULTIPLE POWER ASSURANCE CHECK PROCEDURE FOR AIRCRAFT WITH AN ENGINE INLET BARRIER FILTER INSTALLED

(71) Applicant: Bell Helicopter Textron Inc., Fort Worth, TX (US)

(72) Inventors: Joshua Robert O'Neil, Bedford, TX (US); Martin Peryea, Southlake, TX (US); Andrew Jordan Birkenheuer, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 248 days.

(21) Appl. No.: 15/167,886

(22) Filed: May 27, 2016

(65) Prior Publication Data

US 2016/0347479 A1 Dec. 1, 2016

Related U.S. Application Data

(60) Provisional application No. 62/166,758, filed on May 27, 2015.

(51) Int. Cl.
| | |
|---|---|
| *B64F 5/00* | (2017.01) |
| *B64D 43/00* | (2006.01) |
| *B64F 5/60* | (2017.01) |
| *B64D 45/00* | (2006.01) |
| *B64D 33/02* | (2006.01) |

(52) U.S. Cl.
CPC ............... *B64D 43/00* (2013.01); *B64F 5/60* (2017.01); *B64D 2033/0246* (2013.01); *B64D 2045/0085* (2013.01)

(58) Field of Classification Search
CPC .... B64D 43/00; B64D 2045/0085; B64F 5/60
See application file for complete search history.

(56) References Cited

U.S. PATENT DOCUMENTS

| | | | | |
|---|---|---|---|---|
| 4,094,191 A | * | 6/1978 | Goetsch | G01M 13/00 73/114.41 |
| 2005/0096806 A1 | * | 5/2005 | Diem | G01N 27/4175 701/31.4 |
| 2013/0120165 A1 | * | 5/2013 | McCollough | B64C 27/04 340/946 |
| 2014/0158833 A1 | * | 6/2014 | Braeutigam | B64D 33/02 244/53 B |

* cited by examiner

*Primary Examiner* — Hunter B Lonsberry
*Assistant Examiner* — Mathew Franklin Gordon
(74) *Attorney, Agent, or Firm* — Lightfoot & Alford PLLC (57) ABSTRACT

A method of conducting an engine power assurance check includes performing a first engine power assurance check wherein the first engine power assurance check is judged as passing or failing based on power performance values calculated assuming the presence of a substantially clogged or blocked inlet barrier filter and in response to a fail result of the first engine power assurance check, performing a second engine power assurance check wherein the second power assurance check is judged as passing or failing based on power performance values calculated assuming at least one of no inlet barrier filter being installed and an open bypass of an installed inlet barrier filter.

19 Claims, 6 Drawing Sheets

MULTIPLE POWER ASSURANCE CHECK PROCEDURE FOR AIRCRAFT WITH AN ENGINE INLET BARRIER FILTER INSTALLED

CROSS-REFERENCE TO RELATED APPLICATIONS

This patent application claims the benefit of the filing date of the U.S. Provisional Patent Application Ser. No. 62/166,758, filed on 27 May 2015 and entitled "METHOD AND SYSTEM FOR PERFORMING MULTIPLE POWER ASSURANCE CHECKS IN AIRCRAFT HAVING ENGINE INLET BARRIER FILTER," the entire content of which is hereby expressly incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some aircraft utilize inlet barrier filters (IBFs) associated with engine air inlets to filter particulate matter from air fed to the engine. In some cases, installation of an IBF requires utilization of aircraft performance charts that assume the filter media of the inlet barrier filters are clogged to a maximum allowable point without requiring opening of an inlet bypass door of the IBF. As such, utilization of the above-described aircraft performance and prescribes reduced aircraft performance. Alternatively, such accounting of reduced engine performance may take place in an engine power assurance check procedure, which attempts to minimize the reduction of aircraft performance. In cases where an engine fails to meet the minimum performance as judged by use of the above-described aircraft power performance charts, some power assurance check procedures require aborting a mission or changing mission capability expectations.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
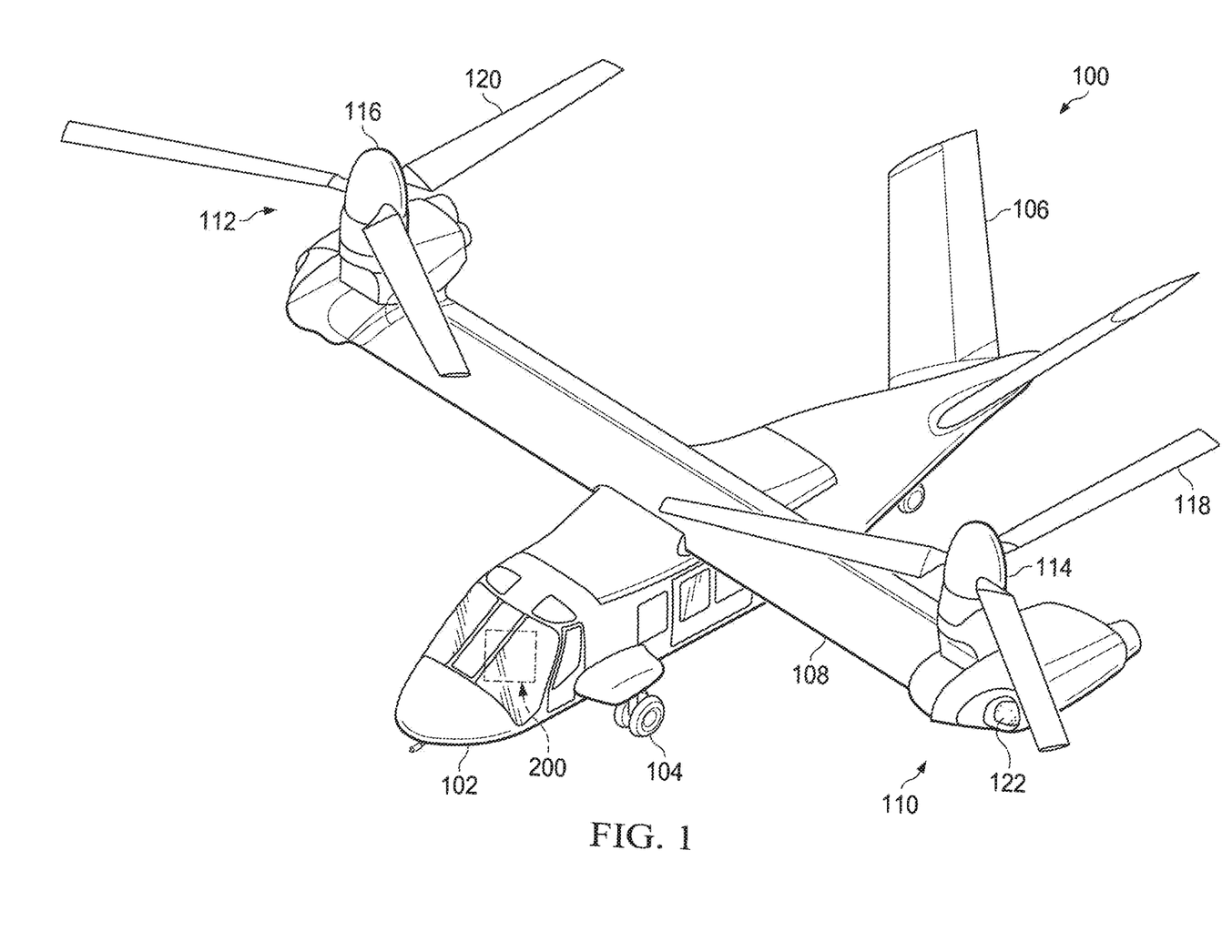
FIG. 1 is an oblique view of an aircraft according to an embodiment of this disclosure showing the aircraft in a helicopter mode of operation.

Referring to FIG. 1 in the drawings, a tiltrotor aircraft 100 is illustrated. Tiltrotor aircraft 100 can include a fuselage 102, a landing gear 104, a tail member 106, a wing 108, a propulsion system 110, and a propulsion system 112. Each propulsion system 110 and 112 includes a fixed engine and a rotatable proprotor 114 and 116, respectively. Each rotatable proprotor 114 and 116 have a plurality of rotor blades 118 and 120, respectively, associated therewith. The position of proprotors 114 and 116, as well as the pitch of rotor blades 118 and 120, can be selectively controlled in order to selectively control direction, thrust, and lift of tiltrotor aircraft 100.

Figure 2:
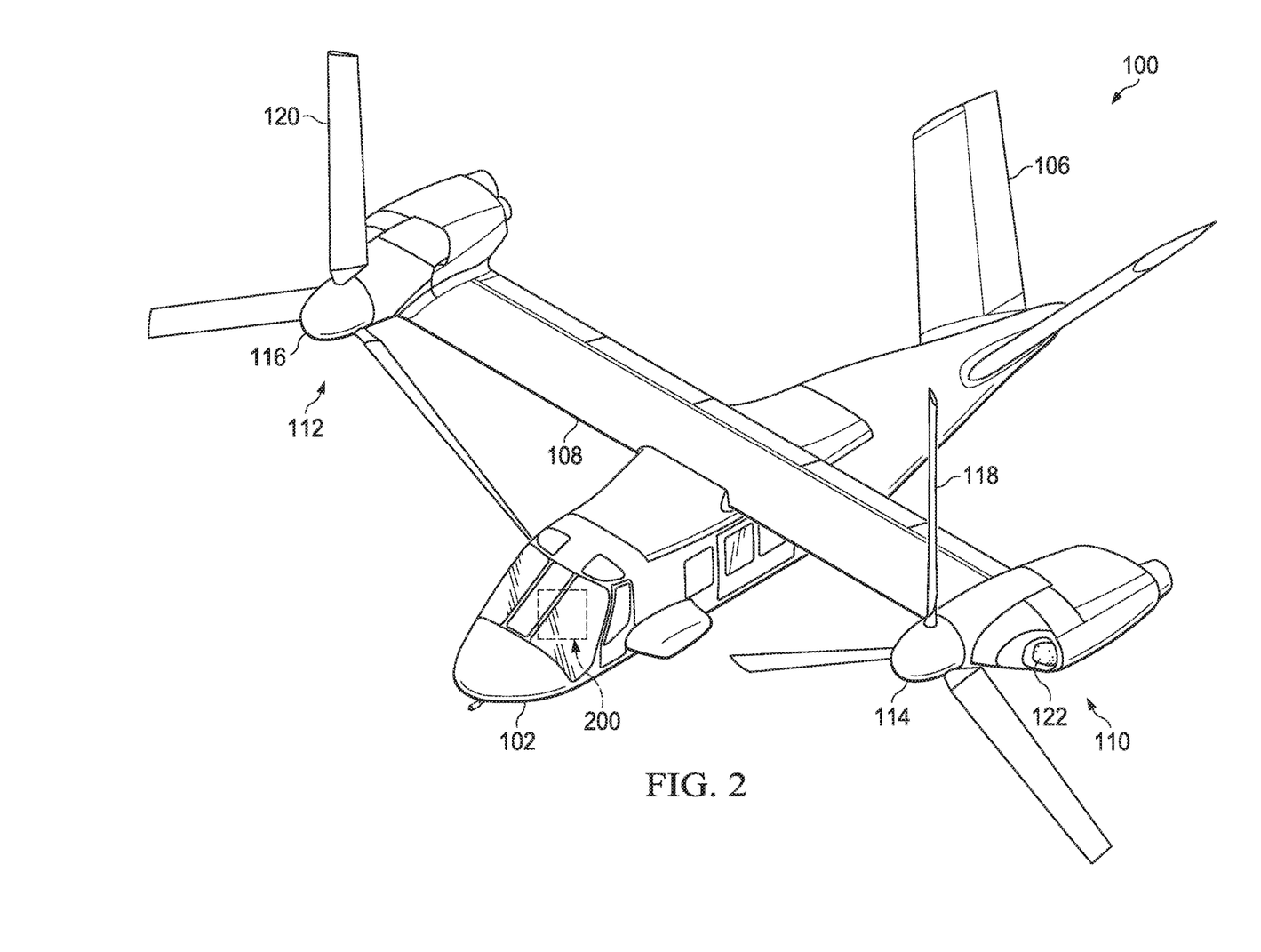
FIG. 2 is an oblique view of the aircraft of FIG. 1 showing the aircraft in an airplane mode of operation.

FIG. 1 illustrates tiltrotor aircraft 100 in a grounded helicopter mode, in which proprotors 114 and 116 are positioned substantially vertical to provide a lifting thrust. FIG. 2 illustrates tiltrotor aircraft 100 in an airplane mode, in which proprotors 114 and 116 are positioned substantially horizontal to provide a forward thrust in which a lifting force is supplied by wing 108. It should be appreciated that tiltrotor aircraft can be operated such that proprotors 114 and 116 are selectively positioned between airplane mode and helicopter mode, which can be referred to as a conversion mode.

The propulsion system 112 is substantially symmetric to the propulsion system 110; therefore, for sake of efficiency certain features will be disclosed only with regard to propulsion system 110. However, one of ordinary skill in the art would fully appreciate an understanding of propulsion system 112 based upon the disclosure herein of propulsion system 110.

Further, propulsion systems 110 and 112 are illustrated in the context of tiltrotor aircraft 100; however, propulsion systems 110 and 112 can be implemented on other tiltrotor aircraft. For example, an alternative embodiment may include a quad tiltrotor that has an additional wing member aft of wing 108, the additional wing member can have additional propulsion systems similar to propulsion systems 110 and 112. In another embodiment, propulsion systems 110 and 112 can be used with an unmanned version of tiltrotor aircraft 100. Further, propulsion systems 110 and 112 can be integrated into a variety of tiltrotor aircraft configurations.

In this embodiment, the tiltrotor aircraft 100 comprises inlet barrier filters (IBFs) 122 generally associated with air inlets to the propulsions system 110, 112 engines. Each IBF 122 generally comprises a filter media 124 configured to trap particulate matter entrained in air passing through the filter media 124, a differential pressure sensor 126 configured to provide information regarding the pressure differential across the IBF 122, a bypass door 128 configured to selectively open and close so that air can be allowed to bypass the filter media 124, and a bypass door actuator 130 configured to selectively open and close the bypass door 128. In some cases, the filter media 124 comprises multiple layers of cotton gauze saturated with oil that forms a tack barrier that increases the capture efficiency of the filter. In some cases, the bypass door 128 is associated with a bypass inlet used when a main engine air inlet through the IBF 122 becomes clogged or blocked, such as when the filter media 124 is dirty. In some cases, opening the bypass door 128 allows unfiltered air to be drawn into an engine. The tiltrotor aircraft 100 further comprises an integrated avionics control system 200 described in greater detail below.

Figure 3:
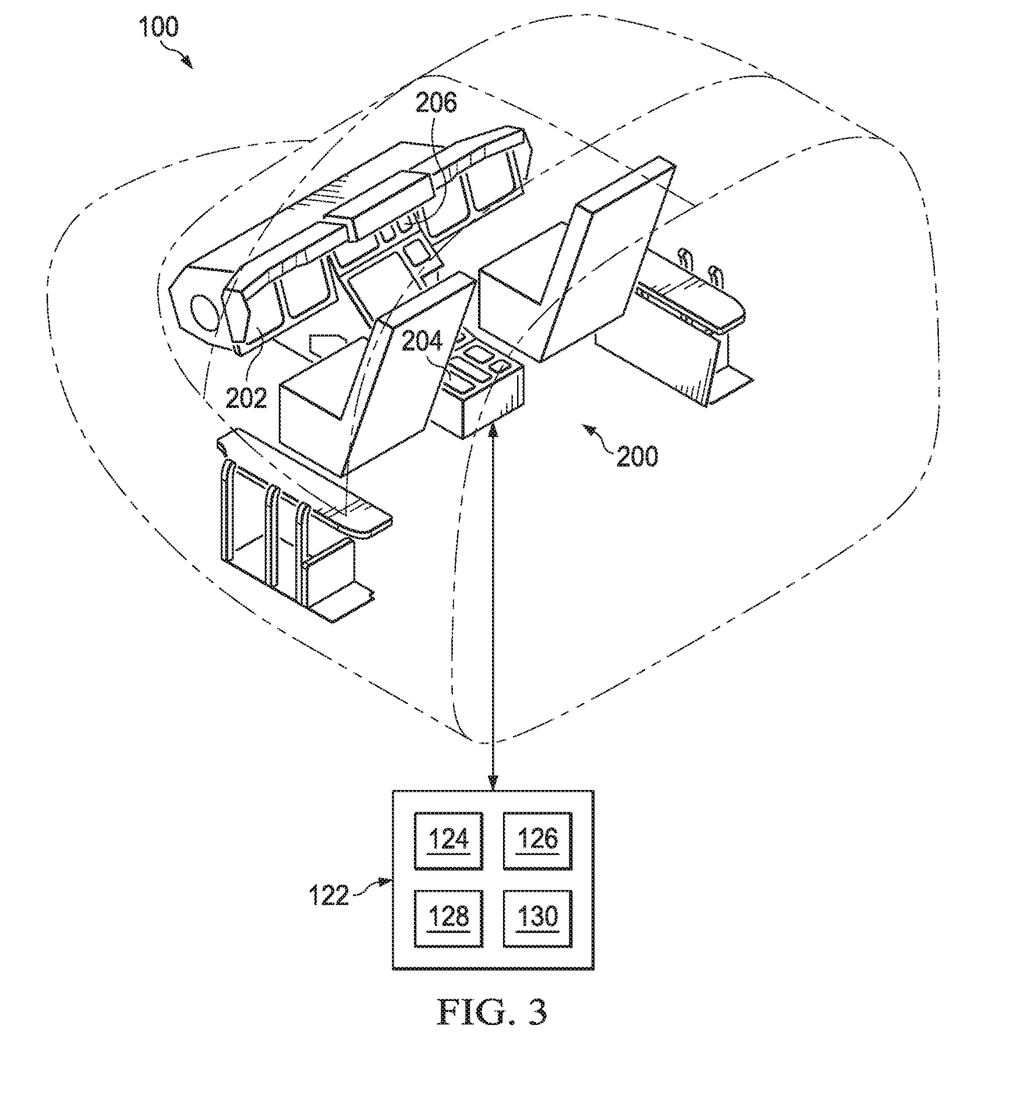
FIG. 3 is a partial oblique view of the aircraft of FIG. 1.

Referring now to FIG. 3, integrated avionics control system 200 is shown disposed in a cockpit of the aircraft 100. The system 200 generally comprises displays 202, input devices 204, instruments 206, and controls 208 configured to interact with a flight system to control the aircraft 100. The system 200 is further configured to send control outputs to the many physical and information systems of the aircraft 100, such as, but not limited to, bypass door actuators 130 and other components that affect physical operation of the aircraft 100. The system 200 is further configured to receive control feedback from the many physical and information systems of the aircraft 100, such as, but not limited to, pressure information from the differential pressure sensor 126, so that it can provide feedback regarding the physical operation, location, and/or condition of the aircraft 100. Most generally, the above described components of the system 200 can be utilized in an automated and/or user managed manner to control the aircraft 100 in normal operation of the aircraft 100, such as pre-flight systems checks and aircraft flight.

Figure 4:
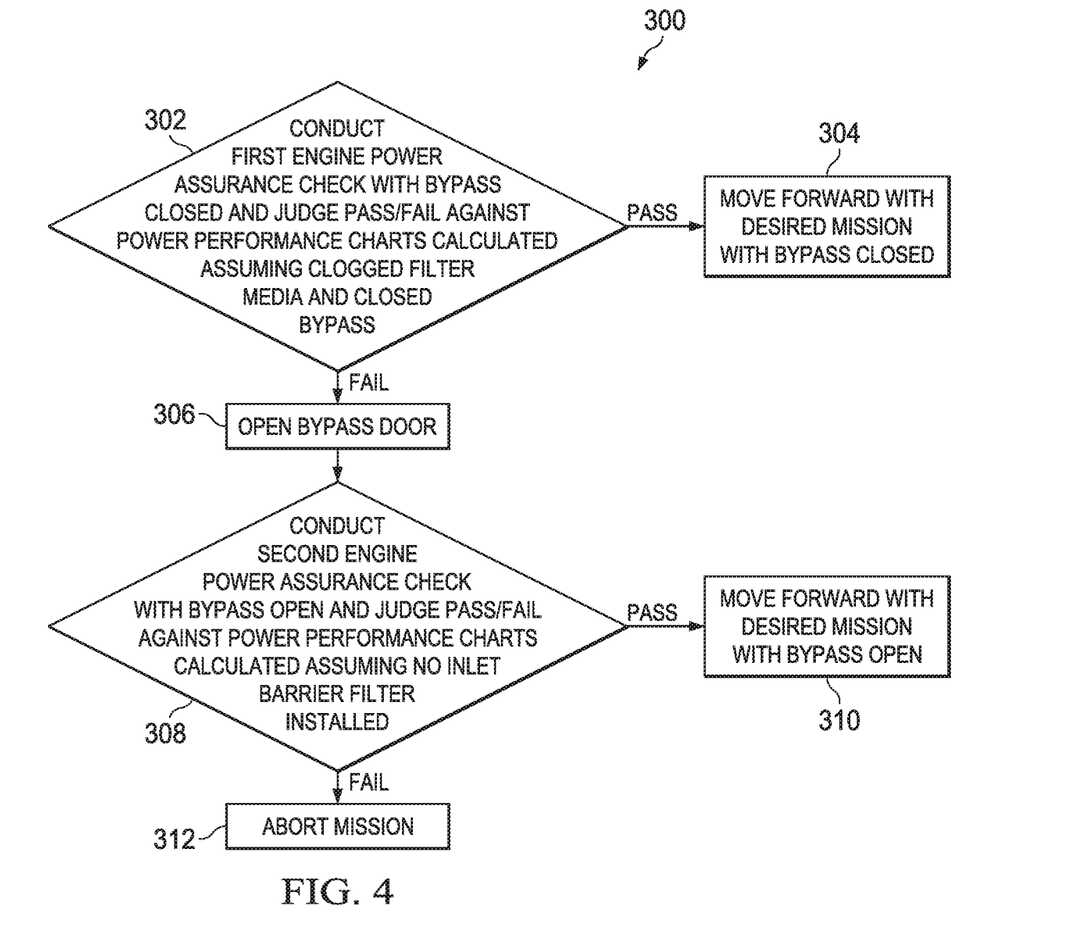
FIG. 4 is a flow chart of a method of operating a control system.

In some embodiments, the system 200 can be used to conduct preflight system checks, such as, but not limited to, a two-stage power assurance check according to a method 300 configured to minimize mission cancellations attributable to safety checks based on assumed blocked or clogged IBFs 122. Referring now to FIG. 4, the two-stage power assurance check method 300 can be used to perform a first engine check based on utilization of the IBFs 122 and, if necessary due to a failure to pass the first engine check, perform a second engine check based on an assumed removal of the IBFs 122 accomplished by opening the bypass doors 128. The method 300 can begin at block 302 by conducting a first engine power assurance check with the bypass doors 128 closed and determining a pass/fail status based on engine performance charts calculated utilizing the assumption that the filter media 124 is substantially clogged. The assumption that the filter media is substantially clogged may in some cases indicate that 2-3% less power is available than may actually be available. If the first engine power assurance check is a pass or success, the method 300 may progress to block 304 where the mission can be moved forward with or at least not aborted as a function of the first engine power assurance check. However, if the first engine power assurance check is a fail or unsuccessful, rather than aborting the mission or requiring engine maintenance, the method 300 may progress to block 306. At block 306, the method 300 progresses by opening the bypass doors 128.

Once the bypass doors 128 are open, the method 300 may progress to block 308 where a second engine power assurance check is conducted. The second power assurance check is conducted with the bypass doors 128 open and the method 300 determines a pass/fail status based on engine performance charts calculated utilizing the assumption that the IBFs 122 are not installed or the assumption that the bypass doors 128 are open so that there is no assumed 2-3% reduction of power available. If the second power assurance check is a pass or success, the method 300 may progress to block 310 where the mission can be moved forward with or at least not aborted as a function of the second power assurance check. However, if the second engine power assurance check is a fail or unsuccessful, the mission may be aborted at block 312 and/or engine maintenance and/or engine inspections may be required. In some cases, if the second power assurance check was implemented to receive a pass or success, the system 200 may subsequently require the bypass doors 128 to be open to pass power assurance checks until a maintenance action is taken on the IBFs 122 and/or the engines.

In some embodiments, the above-described method 300 may be fully or partially implemented manually or fully or partially automated. In some cases, the method 300 can be manually implemented by a user by manually utilizing the system 200 to selectively speed up the engines, open and/or close bypass doors 128, and/or make the above-described pass/fail determinations utilizing engine performance charts, graphs, and/or other tools. In other cases, the method 300 can be substantially and/or fully automated utilizing the system 200 to automatically speed up the engines, open and/or close bypass doors 128, and/or make the above-described pass/fail determinations. In some cases, the system 200 may automatically open the bypass doors 128 by controlling the bypass door actuators 130 associated with the bypass doors 128.

In embodiments where the system 200 is utilized to conduct the method 300, the system 200 may first detect installation of one or more IBFs 122. If one or more IBFs 122 are determined by the system 200 as being installed, the system 200 may implement the method 300 starting at block 302. However, in cases where no IBFs 122 are determined by the system 200 as being installed, the system 200 may implement the method 300 starting at block 308. In some cases, the system 200 may prompt a user to select which of the first and second power assurance checks to implement. Next, a user may select one of the first and second power assurance checks. Next, the system 200 may check and confirm that the selected power assurance check is compatible with the status of whether an IBF 122 is installed and the status of whether the bypass door 128 is open or closed. Next, the system may prompt the user to correct any discrepancies, such as, but not limited to, prompting the user to close the bypass door 128 when there is an IBF 122 installed and the first power assurance check is selected. In some embodiments, some inputs and displays of the system are received and provided using a touchscreen interface.

Figure 5:
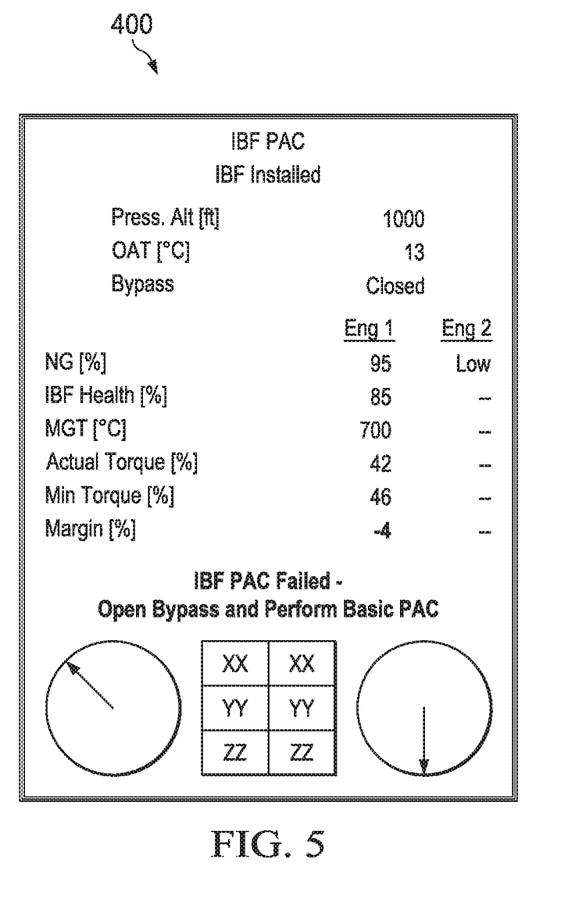
FIG. 5 is a sample display of a control system of the aircraft of FIG. 1.

Referring now to FIG. 5, a system 200 display 400 is shown as configured for display to a user when performing the first power assurance check. In this embodiment of a display 400, the first power assurance check is identified and labeled as "IBF PAC." Also, a confirmation message, "IBF Installed," is shown to confirm that the system 200 has detected installation of an IBF 122. Further, the bypass door 128 status is shown as "Closed." In addition to other operating and environmental parameters being displayed, the display 400 shows that the first power assurance check has failed and was unsuccessful by displaying "IBF PAC Failed—Open Bypass and Perform Basic PAC." The display 400 clearly indicates statuses that do not meet the criteria of the first power assurance check and the pilot or user is prompted to correct the status problems and/or the system 200 can automatically correct the status problems. Further, engine and IBF 122 parameters required to complete and assess power assurance check margin are shown. The list of parameters may vary depending on aircraft requirements. Parameters that do not meet the criteria of the first power assurance check are clearly indicated and the pilot or user is prompted to correct the problem and/or the system 200 can automatically correct the problems. While powerplant and other gauging information is shown on display 400, they may not be included or may be presented elsewhere.

Figure 6:
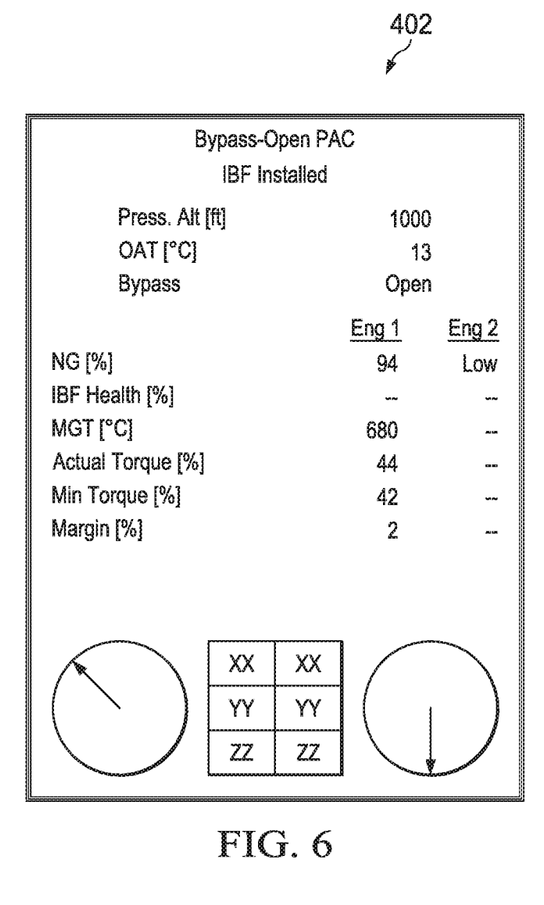
FIG. 6 is another sample display of a control system of the aircraft of FIG. 1.

Referring now to FIG. 6, a system 200 display 402 is shown as configured for display to a user when performing the second power assurance check. In this embodiment of a display 402, the second power assurance check is identified and labeled as "Bypass-Open PAC." Also, a confirmation message, "IBF Installed," is shown to confirm that system 200 has detected installation of an IBF 122. Further the bypass door 128 status is shown as "Open." In general, relative to display 400, the parameters and statuses of display 402 are updated to reflect the second power assurance check. For example, the IBF 122 health/status is not displayed when the bypass door 128 is open. An engine health margin is newly calculated and displayed. If the second power assurance check is a fail or unsuccessful, the pilot or user is clearly notified and prompted to take corrective action prior to dispatch and/or conducting a mission.

Figure 7:
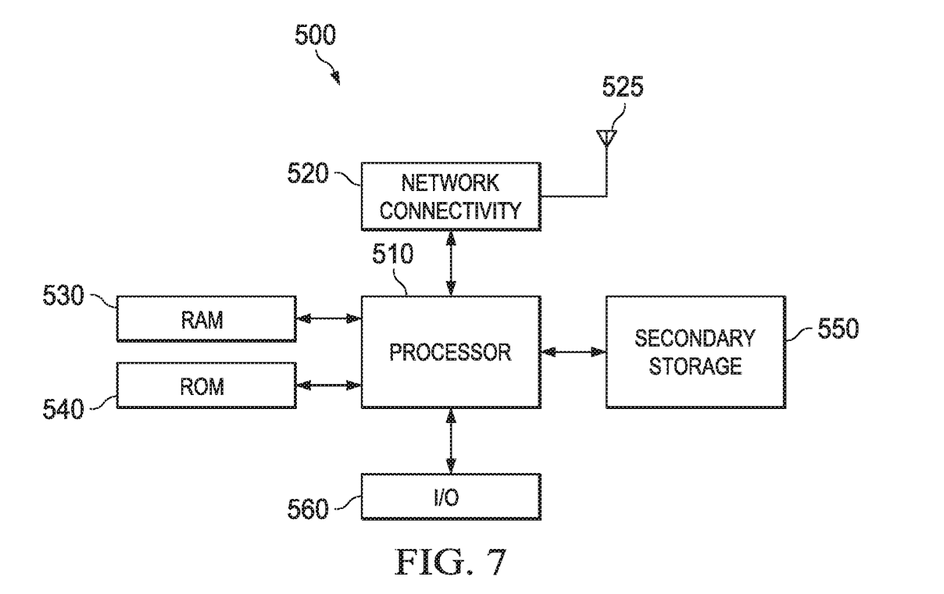
FIG. 7 is a simplified representation of a general-purpose processor (e.g. electronic controller or computer) system suitable for implementing the embodiments of the disclosure.

FIG. 7 illustrates a typical, general-purpose processor (e.g., electronic controller or computer) system 500 that includes a processing component 510 suitable for implementing one or more embodiments disclosed herein. In particular, the system 200 may comprise one or more systems 500. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by a processor, the instructions may be executed simultaneously, serially, or otherwise by one or multiple processors. The processor 510 may be implemented as one or more CPU chips.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touch screen displays, keyboards, keypads, switches, dials, mice, track balls, voice recognizers, card readers, paper tape readers, printers, video monitors, transducers, sensors, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed herein.

Figure 8:
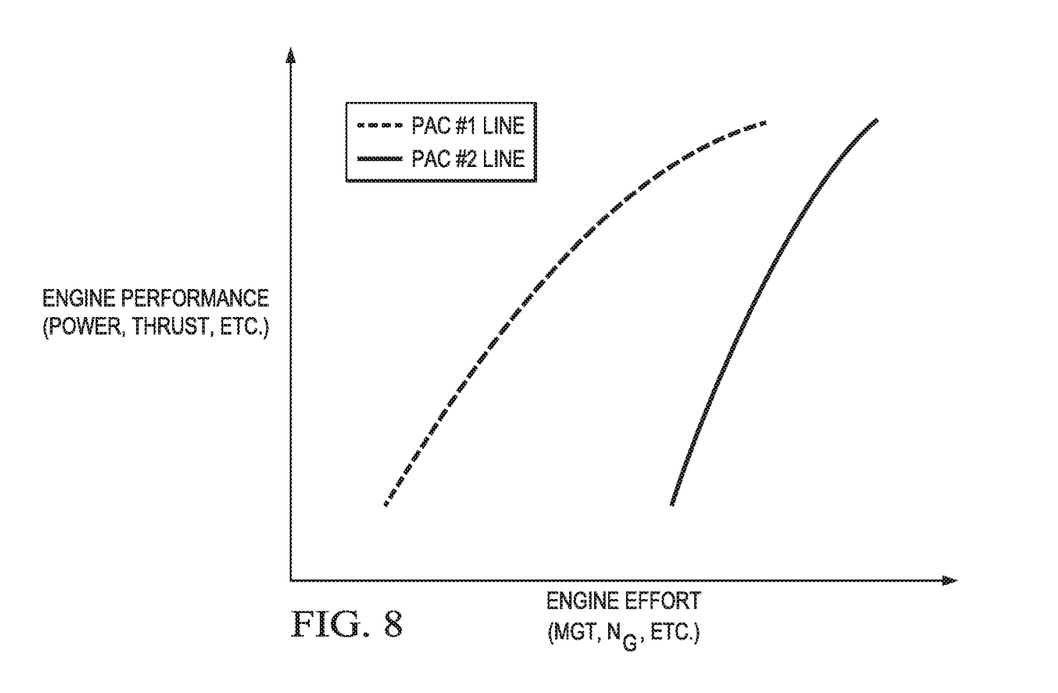
FIG. 8 is a chart showing simplified representations of a first power assurance check line associated with a closed bypass door and a second power assurance check line associated with an open bypass door.

Referring now to FIG. 8, a chart showing two power assurance check (PAC) lines are shown. In some embodiments, the above-described first power assurance check can utilize the PAC line #1 while the above-described second power assurance check can utilize the PAC line #2. Most generally, the PAC line #1 requires an engine to use less effort to produce a given power than does the PAC line #2. In cases where an engine cannot perform to meet the requirements of PAC line #1 during a first power assurance check, the engine may be retested using a second power assurance check to determine if the engine can perform to meet the requirements of PAC line #2. It will be appreciated that there are many ways to measure engine performance and engine effort, accordingly, the variables listed as been associated with Effort and Performance are possible variables but not required or all-inclusive.

While the systems and methods described above are directed toward a tiltrotor aircraft, the systems and methods can similarly be applied to other aircraft, such as, but not limited to, Bell Helicopter Textron Inc.'s 525 Relentless helicopter.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of conducting an engine power assurance check, comprising:
    performing a first engine power assurance check wherein the first engine power assurance check is judged as passing or failing based on power performance values calculated according to a first set of criteria related to an inlet barrier filter; and
    in response to a fail result of the first engine power assurance check, performing a second engine power assurance check wherein the second power assurance check is judged as passing or failing based on power performance values calculated according to a second set of criteria related to the inlet barrier filter;
    wherein each of the performing the first engine power assurance check and the performing the second power assurance check comprise operating an engine and wherein the second set of criteria is different relative to the first set of criteria; and
    wherein the first set of criteria are based on engine performance charts calculated based on an assumption that the inlet barrier filter is installed and wherein the second set of criteria are based on engine performance charts calculated based on an assumption that the inlet barrier filter is not installed or is bypassed.

2. The method of claim 1, wherein the first engine power assurance check is conducted with a closed inlet barrier filter bypass and wherein the second engine power assurance check is conducted with an open inlet barrier filter bypass.

3. The method of claim 1, wherein the inlet barrier filter bypass is automatically opened in response to the fail result of the first engine power assurance check.

4. The method of claim 3, wherein the inlet barrier filter bypass is opened using an actuator.

5. The method of claim 1, wherein in response to a pass result of the second engine power assurance check, a mission that would be prevented by the fail result of the first engine power assurance check is allowed by a pass result of the second engine power assurance check.

6. The method of claim 5, wherein when the mission is allowed as result of the pass result of the second engine power assurance check, a future mission is allowed only with an open inlet barrier filter bypass until a maintenance action is taken.

7. The method of claim 1, wherein in response to a fail result of the second engine power assurance check, a mission is not allowed.

8. A method of conducting an engine power assurance check, comprising:
    selecting, via a touchscreen interface, one of a first engine power assurance check according to a first set of criteria related to an inlet barrier filter and a second engine power assurance check according to a second set of criteria related to the inlet barrier filter; and
    conducting the selected one of the first engine power assurance check and the second engine power assurance check, wherein the conducting the selected one of the first engine power assurance check and the second engine power assurance check comprises operating an engine, wherein the second set of criteria is different relative to the first set of criteria, and wherein the second engine power assurance check is conducted in response to a fail result of the first engine power assurance check, wherein the first set of criteria are based on engine performance charts calculated based on an assumption that the inlet barrier filter is installed, and wherein the second set of criteria are based on engine performance charts calculated based on an assumption that the inlet barrier filter is not installed or is bypassed.

9. The method of claim 8, further comprising:
    automatically determining whether an inlet barrier filter is installed.

10. The method of claim 8, further comprising:
    automatically determining a status of a bypass of an installed inlet barrier filter.

11. The method of claim 8, further comprising:
    automatically selecting the second engine power assurance check in response to a fail result of the first engine power assurance check.

12. The method of claim 8, further comprising:
    displaying via the touchscreen interface which of the first engine power assurance check and the second engine power assurance check is selected.

13. The method of claim 8, further comprising:
displaying via the touchscreen interface a pass result or a fail result of the selected one of the first engine power assurance check and the second engine power assurance check is selected.

14. The method of claim 8, further comprising:
automatically selecting the second engine power assurance check in response to a determination that at least one of no inlet barrier filter is installed and a bypass of an installed inlet barrier is open.

15. An aircraft, comprising:
an inlet barrier filter; and
an integrated avionics control system configured to selectively conduct (1) a first engine power assurance check with a bypass of the inlet barrier filter closed and according to a first set of criteria related to the inlet barrier filter and (2) a second engine power assurance check with the bypass of the inlet barrier filter open and according to a second set of criteria related to the inlet barrier filter, wherein the second set of criteria is different relative to the first set of criteria and wherein the second power assurance check is conducted in response to a fail result of the first power assurance check, wherein the first set of criteria are based on engine performance charts calculated based on an assumption that the inlet barrier filter is installed, and wherein the second set of criteria are based on engine performance charts calculated based on an assumption that the inlet barrier filter is not installed or is bypassed.

16. The aircraft of claim 15, wherein the second engine power assurance check is automatically conducted in response to a fail result of the first engine power assurance check.

17. The aircraft of claim 15, wherein the bypass of the inlet barrier filter is automatically opened in response to a fail result of the first engine power assurance check.

18. The aircraft of claim 15, wherein the integrated avionics control system comprises a touchscreen interface configured to receive inputs regarding selection of the first engine power assurance check and the second engine power assurance check.

19. The aircraft of claim 18, wherein the touchscreen interface is configured to display pass results and fail results of the first engine power assurance check.

* * * * *